(12) United States Patent
Hochgesang

(10) Patent No.: US 7,335,807 B2
(45) Date of Patent: Feb. 26, 2008

(54) SOLVENTLESS LIQUID ISOPRENE COMPOUNDS

(75) Inventor: Paul J. Hochgesang, Ann Arbor, MI (US)

(73) Assignee: Freudenberg-NOK General Partnership, Plymouth, MI (US)

(*) Notice: Subject to any disclaimer, the term of this patent is extended or adjusted under 35 U.S.C. 154(b) by 620 days.

(21) Appl. No.: 10/329,064

(22) Filed: Dec. 23, 2002

(65) Prior Publication Data

US 2003/0139524 A1  Jul. 24, 2003

Related U.S. Application Data

(60) Provisional application No. 60/342,239, filed on Dec. 21, 2001.

(51) Int. Cl.
C08K 5/00 (2006.01)
C08K 5/04 (2006.01)
C07C 11/18 (2006.01)

(52) U.S. Cl. .......... 585/17; 585/16; 524/413; 524/445; 524/451; 524/522; 524/19; 524/27

(58) Field of Classification Search .......... 585/17, 585/16
See application file for complete search history.

(56) References Cited

U.S. PATENT DOCUMENTS

| | | | |
|---|---|---|---|
| 3,931,074 A | 1/1976 | Gomez | 260/23 |
| 4,048,261 A | 9/1977 | Starmer | 260/888 |
| 4,355,139 A | 10/1982 | Coran et al. | 525/133 |
| 4,421,884 A | 12/1983 | Oyama et al. | 524/209 |
| 4,486,480 A | 12/1984 | Okumoto et al. | 428/36 |
| 4,654,404 A | 3/1987 | Watanabe et al. | 525/315 |
| 4,696,984 A | 9/1987 | Carbonaro et al. | 526/98 |
| 4,833,195 A | 5/1989 | Adur et al. | 524/528 |
| 4,843,128 A | 6/1989 | Cesare | 525/193 |
| 4,921,912 A | 5/1990 | Sagawa et al. | 525/112 |
| 4,960,829 A | 10/1990 | Allen et al. | 525/193 |
| 5,000,981 A | 3/1991 | McGarry et al. | 427/44 |
| 5,068,275 A | 11/1991 | Wiseman | 524/314 |
| 5,080,942 A | 1/1992 | Yau | 428/349 |
| 5,087,668 A * | 2/1992 | Standstrom et al. | 525/237 |
| 5,149,895 A | 9/1992 | Coolbaugh et al. | 585/507 |
| 5,239,000 A | 8/1993 | Kim et al. | 525/133 |
| 5,288,937 A | 2/1994 | Coolbaugh et al. | 585/507 |
| 5,387,730 A | 2/1995 | Coolbaugh et al. | 585/10 |
| 5,510,548 A | 4/1996 | Coolbaugh et al. | 585/12 |
| 5,545,783 A | 8/1996 | Coolbaugh et al. | 585/12 |
| 5,548,028 A | 8/1996 | Tabb | 525/194 |
| 5,551,707 A | 9/1996 | Pauley et al. | 277/233 |
| 5,625,100 A | 4/1997 | Coolbaugh et al. | 585/12 |
| 5,633,341 A | 5/1997 | Abend | 528/335 |
| 5,677,402 A * | 10/1997 | Halasa et al. | 526/174 |
| 5,844,021 A | 12/1998 | Koblitz et al. | 523/173 |
| 5,844,047 A | 12/1998 | Abend | 525/327.7 |
| 5,912,288 A | 6/1999 | Nishimoto et al. | 524/114 |
| 5,958,530 A | 9/1999 | Jeitner | 428/35.7 |
| 6,066,690 A * | 5/2000 | Shibata et al. | 524/413 |
| 6,070,634 A * | 6/2000 | Sandstrom et al. | 152/564 |
| 6,120,869 A | 9/2000 | Cotsakis et al. | 428/42.3 |
| 6,162,847 A | 12/2000 | Fujimoto et al. | 524/120 |
| 6,204,320 B1 * | 3/2001 | Blok et al. | 524/534 |
| 6,214,922 B1 | 4/2001 | Campomizzi | 524/511 |
| 6,232,403 B1 | 5/2001 | Blumler et al. | 525/191 |
| 6,238,787 B1 | 5/2001 | Giles et al. | 428/343 |
| 6,265,474 B1 | 7/2001 | Fujimoto et al. | 524/120 |
| 6,268,056 B1 | 7/2001 | Mills | 428/416 |
| 6,291,374 B1 | 9/2001 | Landi | 442/237 |
| 6,638,632 B2 * | 10/2003 | Ohuchi et al. | 428/448 |

FOREIGN PATENT DOCUMENTS

| | | | |
|---|---|---|---|
| JP | 358005350 A * | 1/1983 | |
| JP | 359062652 A * | 4/1984 | |
| JP | 404004242 A * | 1/1992 | |
| JP | 405077846 A * | 3/1993 | |
| JP | 405176655 A * | 7/1993 | |
| JP | 08104777 * | 4/1996 | |
| JP | 408253739 A * | 10/1996 | |
| JP | 408321442 A * | 12/1996 | |

* cited by examiner

Primary Examiner—Tam M. Nguyen
(74) Attorney, Agent, or Firm—Ronald W. Wangerow; Harness, Dickey & Pierce, PLC

(57) ABSTRACT

In one embodiment, this invention relates to a solventless liquid isoprene compound. The compound includes a liquid isoprene rubber. The compound also includes a curing agent selected from sulfur and/or sulfur donors. The curing agent is present in an amount of at least about 3% by weight of the compound. The compound contains substantially no solvent. In another embodiment, this invention relates to a solventless liquid isoprene compound. The compound includes a liquid isoprene rubber. The compound also includes a non-sulfur curing agent. The curing agent is present in an amount of at least about 5% by weight of the compound. The compound contains substantially no solvent.

8 Claims, No Drawings

SOLVENTLESS LIQUID ISOPRENE COMPOUNDS

CROSS-REFERENCE TO RELATED APPLICATION

This application claims the benefit of U.S. provisional application Ser. No. 60/342,239, filed Dec. 21, 2001.

BACKGROUND OF THE INVENTION

This invention relates in general to elastomeric compositions, and in particular to compounds made with a liquid isoprene rubber.

Liquid isoprene rubbers are conventionally used in a minor amount as a plasticizer or processing aid in combination with a solid elastomer in preparing a rubber compound. It has not previously been thought to use a liquid isoprene rubber as the base elastomer for making a compound, and then to cure the liquid isoprene rubber.

Rubber compounds are conventionally made by mixing the elastomer(s) and other chemicals together in an organic solvent, or in an aqueous solvent to prepare an emulsion. It has not previously been thought to prepare a liquid isoprene rubber compound without the use of a solvent, and there has been no suggestion how to prepare the compound in a solventless process. Such a process is contrary to the conventional thinking.

SUMMARY OF THE INVENTION

In one embodiment, this invention relates to a solventless liquid isoprene compound. The compound includes a liquid isoprene rubber. The compound also includes a curing agent selected from sulfur and/or sulfur donors. The curing agent is present in an amount of at least about 3% by weight of the compound. The compound contains substantially no solvent.

In another embodiment, this invention relates to a solventless liquid isoprene compound. The compound includes a liquid isoprene rubber. The compound also includes a nonsulfur curing agent. The curing agent is present in an amount of at least about 5% by weight of the compound. The compound contains substantially no solvent.

Various objects and advantages of this invention will become apparent to those skilled in the art from the following detailed description of the preferred embodiment.

DETAILED DESCRIPTION OF THE PREFERRED EMBODIMENT

The liquid isoprene compounds of the invention use liquid isoprene rubbers as the base material for the compounds. Surprisingly, the compounds are made with substantially no solvent, e.g., not more than about 2% solvent. It has been discovered that liquid isoprene compounds having excellent properties can be made without solvent by using an increased amount of curing agent compared to conventional methods.

The solventless liquid isoprene compounds of the invention contain a liquid isoprene rubber, a curing agent, and optionally other curing chemicals and other compounding ingredients as described below.

The Liquid Isoprene Rubber

The liquid isoprene rubber can be any suitable type of liquid isoprene-containing rubber. One nonlimiting example is Claprene® L-IR-30, L-IR-50 or L-IR-503 manufactured by Kuraray Co., Ltd., Kashima, Japan. Preferably, the liquid isoprene rubber is present in an amount between about 40% and about 97% weight of the compound.

Optional Solid Elastomer

In some applications, it may be desirable to add to the compound a solid isoprene rubber having a Mooney value of not more than about 75. A low Mooney isoprene rubber can be added to improve the physical properties of the liquid isoprene rubber without substantial loss in its flowability and processability. Preferably, the amount of the solid isoprene rubber is not more than about 49% by weight of the total rubber.

The Curing Agent

The curing agent (vulcanizing agent) can be any type suitable for curing the liquid isoprene rubber. Some typical curing agents include sulfur, sulfur donors, and nonsulfur curing agents such as peroxides, metal oxides, difunctional resins, and amines. Sulfur donors include sulfur-containing chemicals such as tetramethylthiuram disulfide (TMTD), dipentamethylenethiuram hexasulfide (DPTH), bis(2,2'-benzothiazolyl)disulfide or benzothiazyldisulfide (MBTS), and dimorpholinyl disulfide (DTDM).

Any suitable type of sulfur can be used. A nonlimiting example of a suitable sulfur is Spider® brand sulfur manufactured by C.P. Hall, Chicago, Ill.

Any suitable type of peroxide curing agent can be used. Some nonlimiting examples of peroxide curing agents are Varox® DBPH-50, a 50% 2,5-dimethyl-2,5-di(t-butyl-peroxyl) hexane manufactured by R. T. Vanderbilt Co., Norwalk, Conn.; Vul-Cup® 40KE manufactured by Hercules, Inc., Wilmington, Del.; Cadox® TS-50 manufactured by Akzo Chemical, Chicago, Ill.; and MEK (methyl ethyl ketone) peroxides.

The liquid isoprene compounds contain an increased amount of curing agent compared to conventional rubber compounds. When the curing agent is a sulfur and/or a sulfur donor, the curing agent is usually present in an amount of at least about 3% by weight of the compound, and preferably between about 3% and about 10%. When the curing agent is a nonsulfur curing agent, the curing agent is usually present in an amount of at least about 5% by weight of the compound, and preferably between about 5% and about 12%.

Other Curing Chemicals

The compounds can also optionally include other curing chemicals, such as activators, crosslinking enhancers, accelerators, and/or retarders. Any suitable type of activator can be used. Some nonlimiting examples of activators are zinc oxide, stearic acid, combinations of zinc oxide and stearic acid, other metal oxides, other fatty acids, and phosphonium salts.

Any suitable type of crosslinking enhancer can be used. Some nonlimiting examples are TAIC (triallyl isocyanurate), which is manufactured by companies such as Nippon Kasei Chemical, Iwaki, Japan, and Aldrich Chemical Co., Milwaukee, Wis.; Ricon® 152, a homopolymer of butadiene (MW 2,900), which is manufactured by Sartomer, Exton, Pa.; SR-351, trimethylol propane triacrylate, manufactured by Sartomer, Exton, Pa.; and B5405, which is 75% SR-350 (trimethylol propane trimethacrylate) and 25% inert filler acting as a carrier.

If desirable, any suitable type of accelerator can be used. Some nonlimiting examples of accelerators are hexamethylenetetramine, mercaptobenzothiazoles, sulfenamides, thiurams, dithiocarbamates, and guanidines. Also, any suitable type of retarder can optionally be used. Some nonlimiting examples of retarders are organic acids and anhydrides, cyclohexylthiophthalimide, and sulfenamide.

Other Compounding Ingredients

The compounds can also optionally include other compounding ingredients, such as fillers, bonding agents, antidegradants, process oils, plasticizers, coloring agents, or other desirable ingredients. Any suitable type of filler can be used. Some typical fillers are carbon black, silica, and clay. Nonlimiting examples of suitable fillers include Sterling® 6630 carbon black, manufactured by Cabot Corporation, Alpharetta, Ga.; FK140 or FK160 silica manufactured by Degussa AG, Dusseldorf, Germany; and CAB-O-SIL® TS-530, a hydrophobic fumed silica, manufactured by Cabot Corp.

Some nonlimiting examples of bonding agents useful in the compounds are resorcinol (1,3-dihydroxybenzene); and A-151, a vinyl triethoxy silane, which is manufactured by Huayuan Fine Chemicals, Wuhan, China.

Any suitable type of antidegradant can be used, such as antioxidants, antiozonants, and heat stabilizers. Some typical antioxidants are secondary amines, phenolics, and phosphites. A nonlimiting example of a suitable antioxidant is Naugard® 445 antioxidant, which is a 4,4'-di(alpha, alpha-dimethylbenzyl)diphenylamine, manufactured by Uniroyal Chemical Co., Waterbury, Conn.

Any suitable type of process oil can be used, such as petroleum oils or vegetable oils. Some nonlimiting examples of process oils include Sunpar® 2280 paraffinic oil, manufactured by Nippon Sun Oil K.K., Japan; and Chevron ParaLux® Process Oil 6001R, a highly saturated white paraffinic process oil with very low aromatic content, manufactured by ChevronTexaco Corp., San Ramon, Calif. Also, any suitable type of plasticizer can be used, such as petroleum oils.

Optionally, a coloring agent can be added to the compounds. Some nonlimiting examples of coloring agents are man-made mineral pigments such as the Geode® series (e.g., Geode® V-11633 Kelly Green); and the NEOLOR® series of inorganic pigments (e.g., NEOLOR® Red S), both manufactured by Ferro Corp., Cleveland, Ohio.

Processing

The solventless liquid isoprene compounds can be processed in any suitable manner. Typically, the chemicals are mixed together using any suitable mixing equipment, such as planetary mixers (e.g., Ross mixers), internal mixers, two-roll mills, open roll mills or the like. The mixed compound is then applied, pressed, or molded depending on the particular use. Then, the compound is cured using any suitable time and temperature profile. Typically, the compound is cured at a temperature between about 300° F. and about 400° F. for a time between about 3 minutes and about 20 minutes. The compound can be further post cured if desired or necessary, e.g., for 2 to 14 days at 70° F. to 400° F.

Applications

The compounds of the invention can be used in many different applications. Advantageously, the compounds are flowable so that they can take the place of materials such as liquid silicones in many applications. Preferably, the compounds have a viscosity not more than about 50% greater than that of liquid silicones, more preferably not more than about 25% greater, and most preferably not more than about 10% greater. Unlike liquid silicones, the compounds are impermeable to fluids, so their use is beneficial in applications where it is desired to limit the flow of fluids, such as in engine seals to limit the flow of VOC's through the engine. The compounds are also easier to process than liquid silicones. The flowability of the compounds allows them to be applied instead of molded, which can save the costs typically associated with molding. Of course, the compounds can also be molded if desired, and their use is not limited to flowable applications.

Some nonlimiting examples of typical applications include use as sealing members (e.g., gaskets, O-rings, packings or the like) which can be used in many different applications, such as sealing with respect to engine oil, gear oil, transmission oil, or power steering fluid. For example, the compounds can be used for cure in place gasketing (CIPG), inject in place gasketing (IJPG), and form in place gasketing (FIPG). They can be applied robotically thereby resulting in a dispensed sealing bead. The compounds are suitable for making thin seals such as thin layered gaskets, and for making intricate seals and gaskets. They can be used to fill intricate channels in a metal plate. A thin gasket can be injection molded onto a plastic or metal carrier.

The compounds can be used in liquid injection molding (LIM), transfer molding (TM), injection molding.

The compounds can be used to make rubber-coated metal (RCM) products and rubber-coated plastic products. The compounds cure and bond well to the metal and plastic.

The compounds can be used as a screen printing material. Because of their low viscosity, lower pressures are required during the forming process which allows for complicated manufacturing using pressure sensitive material as an integral part of the forming process.

The compounds can be used as a fabric coating in many different applications, e.g., as a coating on airbags or interior portions of airplanes. The compounds can be used as a repair material, e.g., to fill in little holes in bumpers.

Since the compounds are solventless, they can be easily applied by workers without the hazards of breathing in fumes. The compounds can be applied by any suitable method. The compounds can be applied and will cure at room temperature.

EXAMPLES

Some nonlimiting examples of compounds according to the invention were prepared as follows:

| | |
|---|---|
| Liquid Isoprene Rubber (IR 30) | 100.0 |
| Varox DBPH | 8.0 |
| ZnO | 1.5 |

| | | | |
|---|---|---|---|
| IR 30 | 50 | 50 | 50 |
| Silica | 25 | — | — |
| 6630 | — | 25 | 25 |
| Varox | 4 | 4 | 4 |
| ZnO | 0.75 | 0.75 | 0.75 |
| Pigment | 0.5 | — | — |
| Ricon 152 | — | — | 1.0 |

|  |  |  |
|---|---|---|
| IR30 | 50.0 | 50 |
| 6630 | 15.0 | 25 |
| Varox | 4.0 | 2 |
| ZnO | 0.90 | 0.9 |
| B5405 | 1.0 | 1.0 |
| IR 30 | 50 | 50 |
| ZnO | 0.9 | 0.9 |
| Varox | 2 | 2 |
| FK 140 | 12 | 12 |
| B5405 | 1 | 1 |
| Blue Pigment | 1 | 1 |
| Rincon 152 |  | 2 |
| TS-561 |  | 1.2 |

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A solventless liquid isoprene compound comprising:
a liquid isoprene rubber, polymer molecules thereof having a backbone consisting of polyisoprene; and
a nonsulfur curing agent present in an amount of at least about 5% by weight of the compound;
the compound containing substantially no solvent.

2. A compound according to claim 1 wherein the curing agent is present in an amount between about 5% and about 12% by weight of the compound.

3. A compound according to claim 1 wherein the curing agent is a peroxide.

4. A compound according to claim 1 wherein the liquid isoprene rubber is present in an amount of at least about 40% by weight of the compound.

5. A compound according to claim 1 additionally comprising a solid isoprene rubber having a Mooney value of not more than about 75, wherein the solid isoprene rubber is present in an amount of not more than about 49% by weight of the total rubber.

6. A compound according to claim 1 which is readily flowable between about 23° C. and about 150° C.

7. A flowable compound according to claim 1 which can be curable at room or elevated temperature.

8. A solventless liquid isoprene compound comprising:
a liquid isoprene rubber present in an amount of at least about 40% by weight of the compound; and
a peroxide curing agent present in an amount of at least about 5% by weight of the compound, polymer molecules of the liquid isoprene rubber having a backbone consisting of polyisoprene;
the compound containing substantially no solvent;
and the compound being readily flowable between about 23° C. and about 150° C.

* * * * *